(12) United States Patent
Joseph

(10) Patent No.: US 10,585,004 B1
(45) Date of Patent: Mar. 10, 2020

(54) SYSTEMS AND METHODS FOR DETERMINING AMBIENT TEMPERATURE USING LIGHTING BASED SENSORS

(71) Applicant: SIGNIFY NORTH AMERICA CORPORATION, Somerset, NJ (US)

(72) Inventor: Neil Joseph, Sunnyvale, CA (US)

(73) Assignee: SIGNIFY NORTH AMERICA CORPORATION, Somerset, NJ (US)

(*) Notice: Subject to any disclaimer, the term of this patent is extended or adjusted under 35 U.S.C. 154(b) by 164 days.

(21) Appl. No.: 15/211,070

(22) Filed: Jul. 15, 2016

Related U.S. Application Data

(60) Provisional application No. 62/192,879, filed on Jul. 15, 2015.

(51) Int. Cl.
| | |
|---|---|
| *G01K 1/00* | (2006.01) |
| *G01K 11/00* | (2006.01) |
| *G01J 1/42* | (2006.01) |
| *G01K 15/00* | (2006.01) |
| *F24F 11/30* | (2018.01) |
| *F24F 11/62* | (2018.01) |
| *F24F 130/30* | (2018.01) |
| *F24F 11/64* | (2018.01) |
| *F24F 110/10* | (2018.01) |

(52) U.S. Cl.
CPC .............. *G01K 11/00* (2013.01); *F24F 11/30* (2018.01); *F24F 11/62* (2018.01); *G01J 1/42* (2013.01); *G01K 15/005* (2013.01); *F24F 11/64* (2018.01); *F24F 2110/10* (2018.01); *F24F 2130/30* (2018.01)

(58) Field of Classification Search
CPC .............................. G01K 11/00; F24F 11/0012
USPC ........................................................... 702/99
See application file for complete search history.

(56) References Cited

U.S. PATENT DOCUMENTS

| | | |
|---|---|---|
| 8,363,707 B2 | 1/2013 | Hollis |
| 2005/0117190 A1 | 6/2005 | Iwauchi et al. |
| 2006/0165149 A1* | 7/2006 | Kolk .................. G01K 1/20 374/1 |
| 2007/0188427 A1 | 8/2007 | Lys et al. |
| 2007/0211013 A1 | 9/2007 | Uehara et al. |
| 2008/0099568 A1* | 5/2008 | Nicodem ........... G05D 23/1905 236/51 |
| 2010/0277068 A1 | 11/2010 | Broitzman |
| 2011/0121654 A1* | 5/2011 | Recker .................. H02J 9/065 307/66 |
| 2011/0202151 A1 | 8/2011 | Covaro et al. |
| 2012/0080944 A1 | 4/2012 | Recker et al. |
| 2012/0170284 A1 | 7/2012 | Shedletsky |

(Continued)

FOREIGN PATENT DOCUMENTS

| | | | |
|---|---|---|---|
| WO | 2010/068538 A1 | 6/2010 | |
| WO | WO 2010136141 A2 * | 12/2010 | ......... G05D 23/1902 |
| WO | 2013/138613 A1 | 9/2013 | |

*Primary Examiner* — Ricky Ngon
(74) *Attorney, Agent, or Firm* — Akarsh P. Belagodu

(57) ABSTRACT

Systems and methods are provided for determining an ambient temperature in a volume using a lighting based sensor. A status of a light with which a temperature sensor is associated is determined. A correction factor is accessed from a computer-readable medium based on the status of the light. A measured temperature is received via the temperature sensor. The measured temperature is transformed based on the correction factor, and the transformed temperature is transmitted from the light to a remote location.

20 Claims, 8 Drawing Sheets

(56) References Cited

U.S. PATENT DOCUMENTS

| | | | |
|---|---|---|---|
| 2012/0193437 A1* | 8/2012 | Henry, Jr. | G05D 23/1905 236/51 |
| 2012/0319585 A1 | 12/2012 | Shteynberg et al. | |
| 2014/0139137 A1* | 5/2014 | Recker | H05B 37/0272 315/294 |
| 2014/0217887 A1* | 8/2014 | Knoedgen | H05B 33/0815 315/51 |
| 2014/0217927 A1* | 8/2014 | Quinn | H05B 35/00 315/313 |
| 2015/0285526 A1* | 10/2015 | Smith | F24F 11/006 700/276 |
| 2016/0092704 A1* | 3/2016 | Russell | F21V 23/0471 340/10.3 |

* cited by examiner

US 10,585,004 B1

SYSTEMS AND METHODS FOR DETERMINING AMBIENT TEMPERATURE USING LIGHTING BASED SENSORS

CROSS-REFERENCE TO RELATED APPLICATION

The present application claims priority to U.S. Provisional Patent Application No. 62/192,879, filed Jul. 15, 2015, titled "Systems and Methods for Determining Ambient Temperature Using Lighting Based Sensors" which is herein incorporated by reference in its entirety.

FIELD

This disclosure is related generally to temperature measurement and more particularly to temperature sensing using temperature sensors integrated into light bulbs.

BACKGROUND

Micro-location (e.g., single room, locations within a single room) temperature readings can be difficult to acquire using traditional building configurations. Typically, thermostats having temperature sensing capabilities are positioned at a limited number of locations in a building (e.g., certain rooms, at a single location in a large room). The limited locations from which to sample temperature data make it difficult to discern temperature at a high resolution. Higher resolution temperature data can be hugely beneficial in providing energy savings and efficiency while maintaining desired temperature comfort.

SUMMARY

Systems and methods are provided for determining an ambient temperature in a volume using a lighting based sensor. A status of a light with which a temperature sensor associated is determined. A correction factor is accessed from a computer-readable medium based on the status of the light. A measured temperature is received via the temperature sensor. The measured temperature is transformed based on the correction factor, and the transformed temperature is transmitted from the light to a remote location.

As another example, a light configured to determine an ambient temperature in a volume using a lighting based sensor includes a light and a temperature sensor positioned in, on, or attached to the light. A computer-readable medium is encoded with correction factors associated with a plurality of statuses of the light. A data processor is configured to: determine a status of the light; access a correction factor from the computer-readable medium based on the status of the light; receive a measured temperature via the temperature sensor; and transform the measured temperature based on the correction factor. A wireless transmitter is configured to transmit the transformed temperature from the light to a remote location.

DETAILED DESCRIPTION

Figure 1:
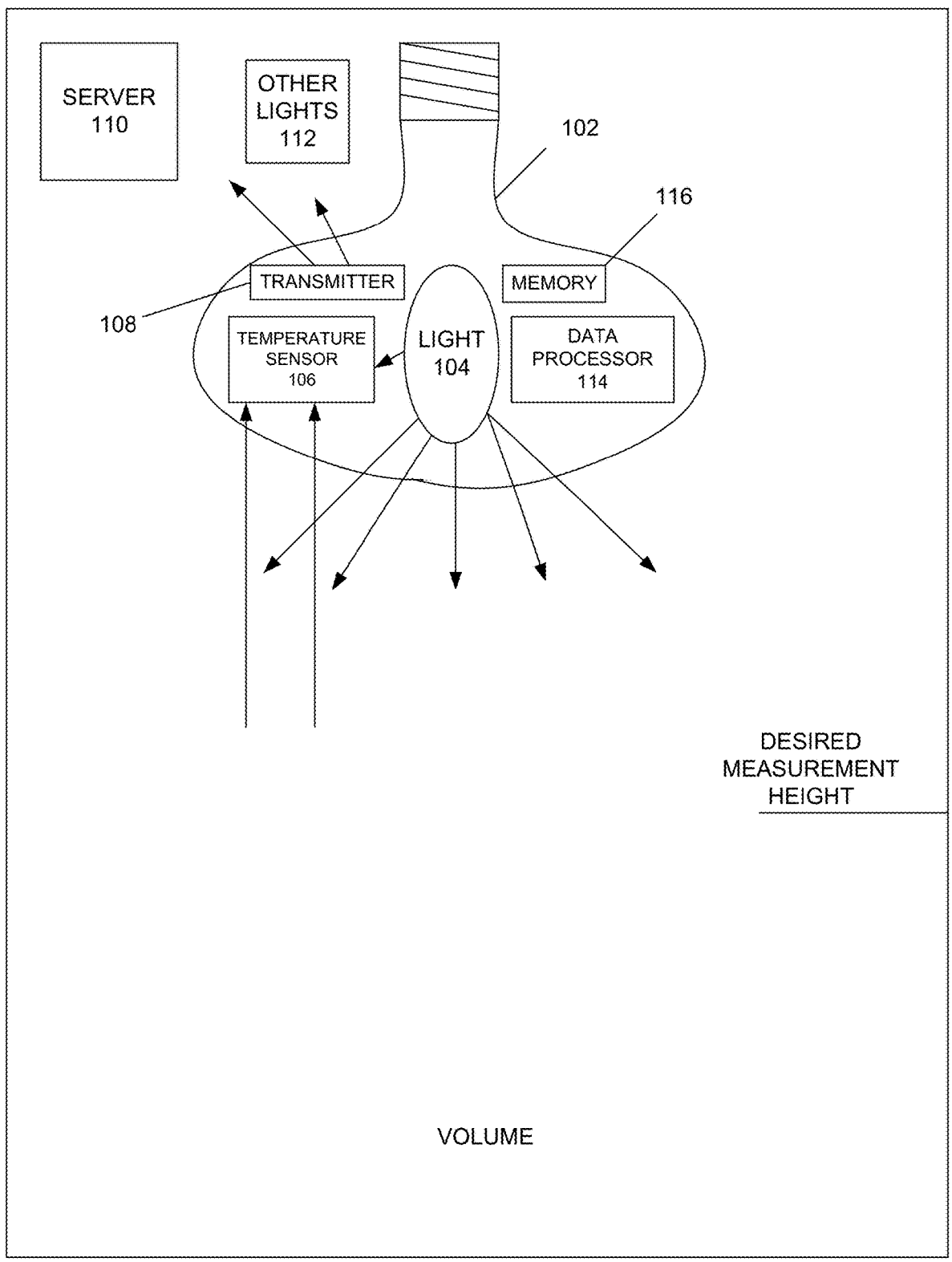
FIG. 1 is a diagram depicting a luminary (e.g., a light) configured to determine an ambient temperature in a volume using a lighting based sensor.

FIG. 1 is a diagram depicting a luminary (e.g., a light) configured to determine an ambient temperature in a volume using a lighting based sensor. As noted above, typical systems include a limited number of temperature sensors, at most one per room, but often one per group of rooms, per floor, or per building. One reason for the limited number of temperature sensors in an environment is a need to wire each temperature sensor. Such sensors traditionally require wiring for power as well as for data communication, such as to a manual or computer control for adjusting a heating/air conditioning unit (HVAC) output.

A luminary (e.g., a lighting fixture, light bulb, lamp, or light module that provides illumination) is typically a most common electronic device in a building. Systems and methods as described herein can, in some embodiments, take advantage of the existing power wiring that already exists in most environments for lighting for powering temperature sensors positioned within, on, or next to a lighting device. Having ready sources of power for the lighting devices that are already distributed in environments enables operation of these distributed temperature sensors. Wireless, or wired communications using existing infrastructure (e.g., transmitting signals via power lines connected to the lighting device) enables communications of measured temperatures from the lighting device to another device (e.g., a server, a thermostat, other lighting devices) that have the capability to adjust HVAC or other environment control settings.

FIG. 1 depicts an example light bulb 102 having a temperature sensor integrated within. The bulb 102 includes a light source 104 that can take a variety of forms including incandescent, halogen, fluorescent, CFL, HID, LPS, and light emitting diodes (LED). The light source 104 may be a simple on-off source 104 or may be adjustable to different levels of output, such as via a dimmer. The light source 104 emits light from the bulb 102 as indicated by the arrows emanating from the light source 102 out of the bulb. The light bulb 102 further includes a temperature sensor 106 (e.g., an infra-red sensor, a photo-detector that detects a phase shift in reflected light from the light source) that takes temperature measurements, based in part on a temperature of a volume (e.g., a room in a home, a portion of a warehouse or factory), as indicated by the arrows entering the light bulb 102 representing ambient heat reaching the temperature sensor 106. The temperature sensor 106 takes temperature measurements, and in the example of FIG. 1, uses a wireless transmitter 108 to transmit data indicative of those temperature sensors to outside entities, such as a server 110, other lights 112 (e.g., data is passed from light bulb to light bulb until it reaches the server, or is passed to a light bulb that has capabilities to update HVAC settings). In one embodiment, the light bulb 102 further includes a data processor 114 and memory 116. The data processor 114 and memory 116 can be used for temporary storage of temperature sensor 106 data (e.g., transmitting data to the server 110 in batches) as well as preprocessing of temperature data prior to transmission.

Following is a discussion of one example of such preprocessing. While installing temperature sensors in, on, or near lighting devices as described above accounts for the power and communications issues for distributed temperature sensing, it does not account for an added complication introduced by placing temperature sensors near light sources. Typically, light sources, like light source 104, emit heat. This is indicated by the arrow from light source 104 to temperature sensor 106. This light source 104 heat interferes with the measurement of ambient temperature of the volume by the temperature sensor 106. Thus, in one embodiment, the data processor 114 may adjust temperature data measured by the temperature sensor 106 based on whether the light source 104 is on or off. In other examples, more complex adjustments to temperature data may be made by the data processor 114, such as based on an amount of time that the light source 104 has been on or off or an output level (e.g., 50%, 90%, 100%) of the light source 104, as described further herein.

In one embodiment, the temperature sensing light bulb 102 seeks to measure temperature at a particular height (e.g., an average height of a person standing or sitting) in the volume. Because heat tends to rise, the ambient temperature near the light bulb 102 may be different than the temperature at a desired measurement height. The data processor may further preprocess the data to account for the temperature varying by height, such as by adjusting a temperature sensor 106 measurement by a particular amount or an adjustment factor, such as a factor informed by a calibration operation (e.g., manual measurement of a temperature at the desired measurement height compared to the ambient temperature nearer to the light bulb near a ceiling).

Preprocessing of temperature data by the data processor 114 may be based on other inputs as well, including heat put off by other devices in the light bulb 102 (e.g., transmitter 108, data processor 114, memory 116). Such adjustments to the temperature data may be based on an activity level of those devices, such as current processing load on the data processor 114 or the current throughput of data by transmitter 108, as those devices may produce more heat when working harder. In certain embodiments, preprocessing, as described in FIG. 1 as occurring in the light bulb 102, may be performed at other entities (e.g., other light bulbs 112 or the server 110), where such processing may be referred to as other than preprocessing (e.g., post processing).

Figure 2:
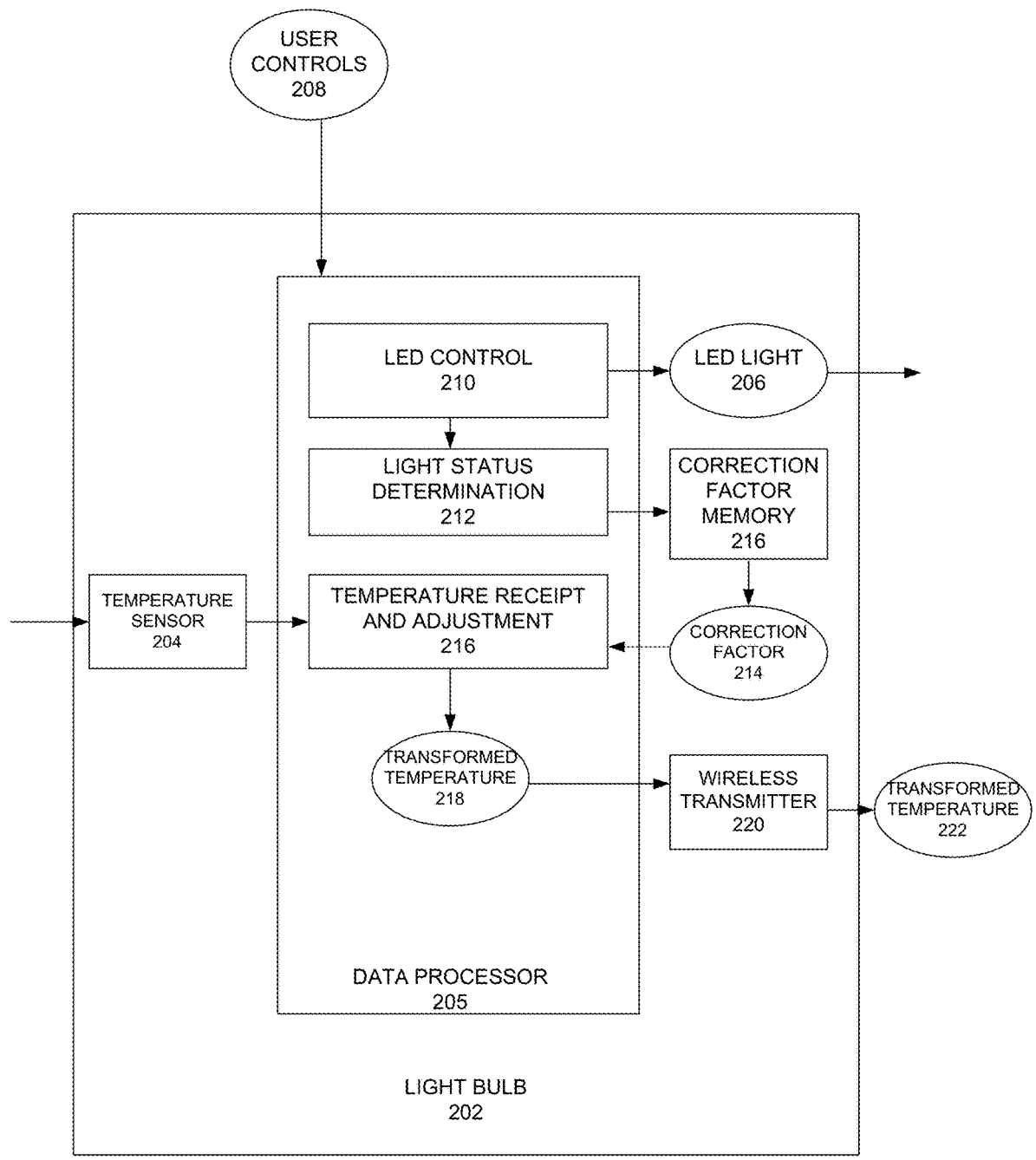
FIG. 2 is a diagram depicting example operations of a luminary based temperature sensor.

FIG. 2 is a diagram depicting example operations of a luminary based temperature sensor. FIG. 2 depicts a light bulb 202. The light bulb 202 includes an integrated temperature sensor 204 that measures a temperature at the temperature sensor 204. As discussed above, the temperature experienced by the temperature sensor 204 is influenced by the ambient temperature of the volume surrounding the light bulb 202 and heat produced by any components of the light bulb including the light source 206 as well as other components shown in FIG. 2, including data processor 205. In the example of FIG. 2, the light bulb 202 includes an LED light source 206. That light source is adjustable based on a user control 208. That user control 208 could be provided in an analog (e.g., via a knob) or digital (e.g., via a smart phone app control) form and sets the amount of light or other parameters (e.g., color, spectrum) of the light emitted by the LED light 206 as commanded by an LED control 210.

In addition to commanding the LED light 206, the LED control 210 also provides data to a light status determination module 212 for ascertaining a current state of the LED light 206. The status of the LED light 206 is useful for adjusting the temperature data acquired by the temperature sensor 204. As noted before, the light source 206 outputs heat that can influence the temperature sensed by the temperature sensor 204. But that influence is not the same at all times. For example, the light source's influence is negligible when the light source 206 has been off long enough to reach a steady state heat output compared to when the light source 206 has been on for a significant amount of time. The heat output of the light source 206 further varies during a period shortly after the light source 206 is turned on, turned off, or its power level is adjusted.

In one embodiment of the disclosure, the data processor 205 adjusts a temperature level output by the temperature sensor 204 according to a correction factor 214 stored in a correction factor memory 216. The correction factor memory 216 in one embodiment is a read only memory, preloaded with correction factors, while in another example, the memory 216 is a flash-type memory, where correction factors 214 can be adjusted, such as based on calibration operations. In the embodiment of FIG. 2, based on a current status of the light source 206 (e.g., the light source 206 was turned on 2 seconds ago) as determined at 212, a correction factor 214 is selected and applied at 216 to produced a transformed temperature 218 (e.g., correction factor=0.8; temperature sensor temp=100; transformed temperature=80). The transformed temperature 218 is provided to a wireless transmitter 220 for transmission outside of the light bulb 202, as indicated at 222, such as to a thermostat-controlling server.

Figure 3:
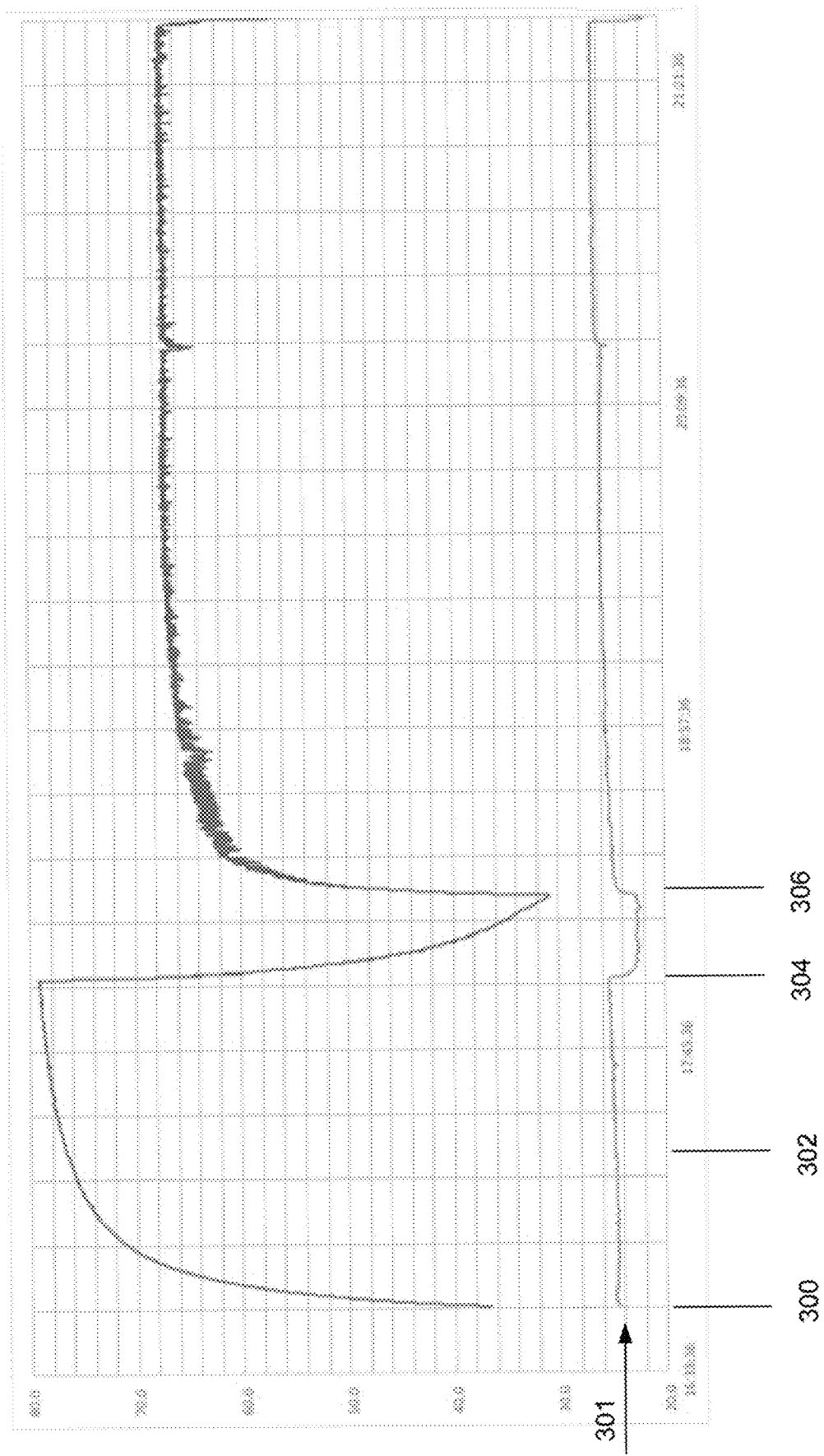
FIG. 3 is a diagram depicting temperature measurements made at a temperature sensor within a light bulb as a light source is transitioned to different states.
Figure 4:
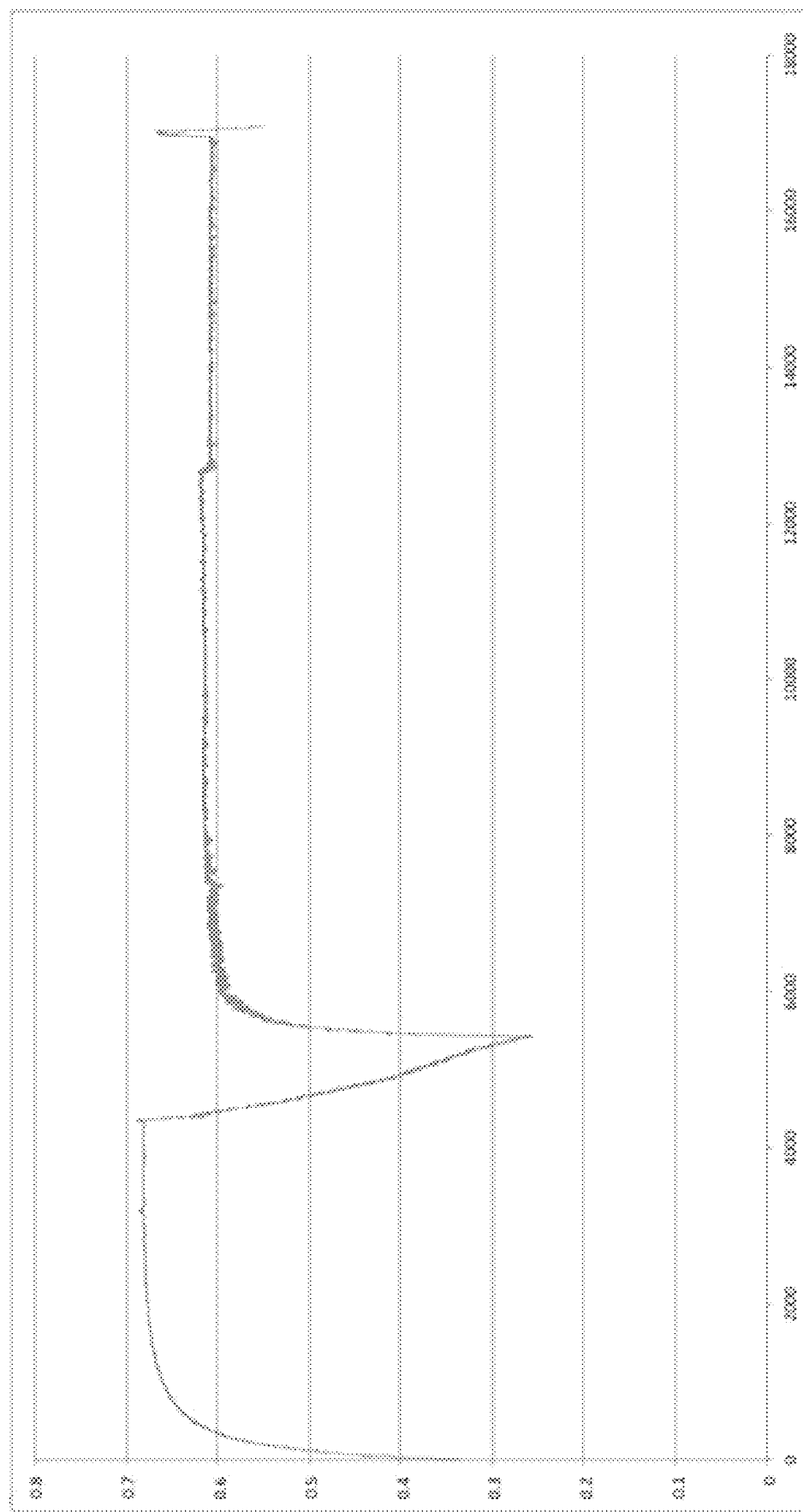
FIG. 4 is a diagram depicting a differential proportion between the internal thermo-probe temperature and ambient air temperature under the identical operating conditions of FIG. 3.

FIG. 3 is a diagram depicting temperature measurements made at a temperature sensor within a light bulb as a light source is transitioned to different states. Such measurements could be taken as part of a calibration operation, such as for identifying correction factors to be applied to sensed temperatures. At the time indicated as 300, the temperature sensor indicates a temperature near the ambient temperature of 30 degrees. A plot at 301 indicates a power level supplied to the light source. As the light source heats up during a period from 300 to 302, the sensed temperature increases at a fast rate. As the light source nears its steady-state heat output, the sensed temperature increase rate declines from 302 to 304, where at 304 the sensed temperature reaches a high point of near 80 degrees. At 304, the light source is turned off, beginning a period of rapid cooling from 304 to 306. At 306, the light source is powered at a 70% power level. The sensed temperature again quickly increases at first, followed by a slower approach to a steady state temperature sensed for the ambient environment in view of the heat outputted by the light source. FIG. 4 is a diagram depicting a differential proportion between the internal thermo-probe temperature and ambient air temperature under the identical operating conditions of FIG. 3.

Figure 5:
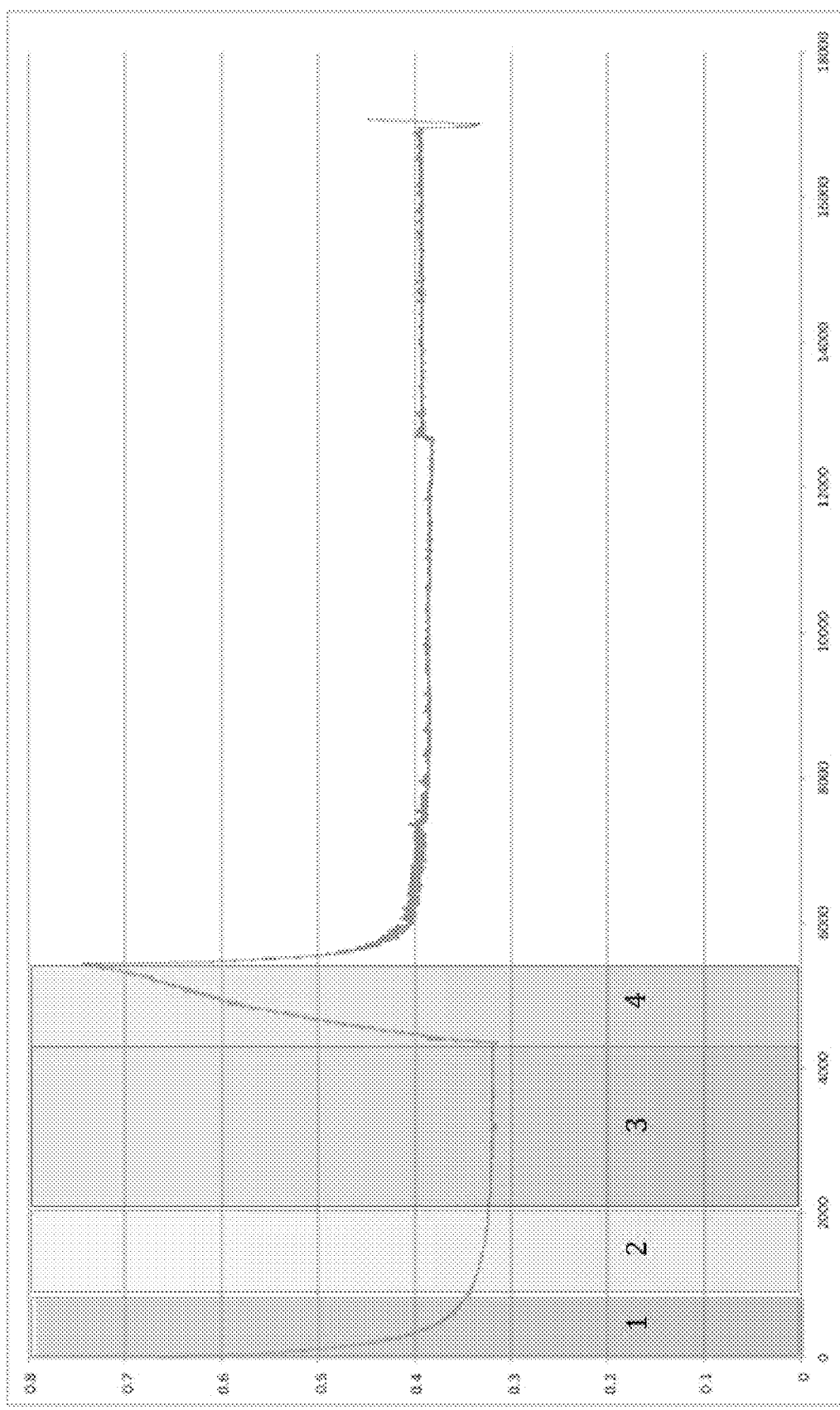
FIG. 5 is a diagram depicting an example set of dynamic correction factors that can be utilized based on the measurement of temperature at a luminary as discussed with regard to FIG. 3.

FIG. 5 is a diagram depicting an example set of dynamic correction factors that can be utilized based on the measurement of temperature at a luminary as discussed with regard to FIG. 3. The plot of FIG. 5 is based on an inverse of the plot of FIG. 4 (i.e., plotted values of FIG. 5 are equal to 1 minus the values of FIG. 4. The example of FIG. 5 indicates four zones associated with a cycle of turning a light source on and then off. A first zone (1) spans about 1.0 s (1000 ms). During the first zone time period, the measured temperature in the light bulb is multiplied by a value having a steep exponential decay from a coefficient of 1.0 towards an asymptote of a bit over 0.3 in the case of this given luminary. In one example, during this time period, the data processor multiplies the measured temperature by a correction factor of:

$$CF=(1-0.68)^t$$

where t is a time ranging from 0 to 1 seconds.

A second zone (2) also spans about 1.0 s, from t=1 s to t=2 s. During the second zone time period, the correction factor still has a decay but with a much shallower slope. That slope may be a near linear fit for most practical purposes, although in some embodiments a curve fit is used. In one example, during this time period, the data processor multiples the measured temperature by a correction factor of:

$$CF=-0.03t+0.38$$

where t is a time ranging from 1 to 2 seconds. A third zone (3) ranges from t=2 s until the light source is turned off and represents a steady state time period where the heat level from the power source that is experienced at the temperature sensor does not change. During this time period, the correction factor in the example of FIG. 5 is equal to 0.32. A fourth zone (4) beginning when the light source is turned off around t=4.2 s adjusts the measured temperature based on a diminishing amount of heat being experienced from the light source. The correction factor in this time period, in one example, is modeled as linear, such as:

$$CF=0.75(t-t_{off})+0.32$$

where $t_{off}$ indicates a time that the light source was turned off. In the example of FIG. 5, the fourth zone correction factor is valid for one second.

In certain examples, the correction factors described in FIG. 5 can further be adjusted based on the power level of the light source. If it is determined that the heat output of the light source at 50% is half that of the light source at 100%, the correction factor can further be adjusted accordingly.

Figure 6:
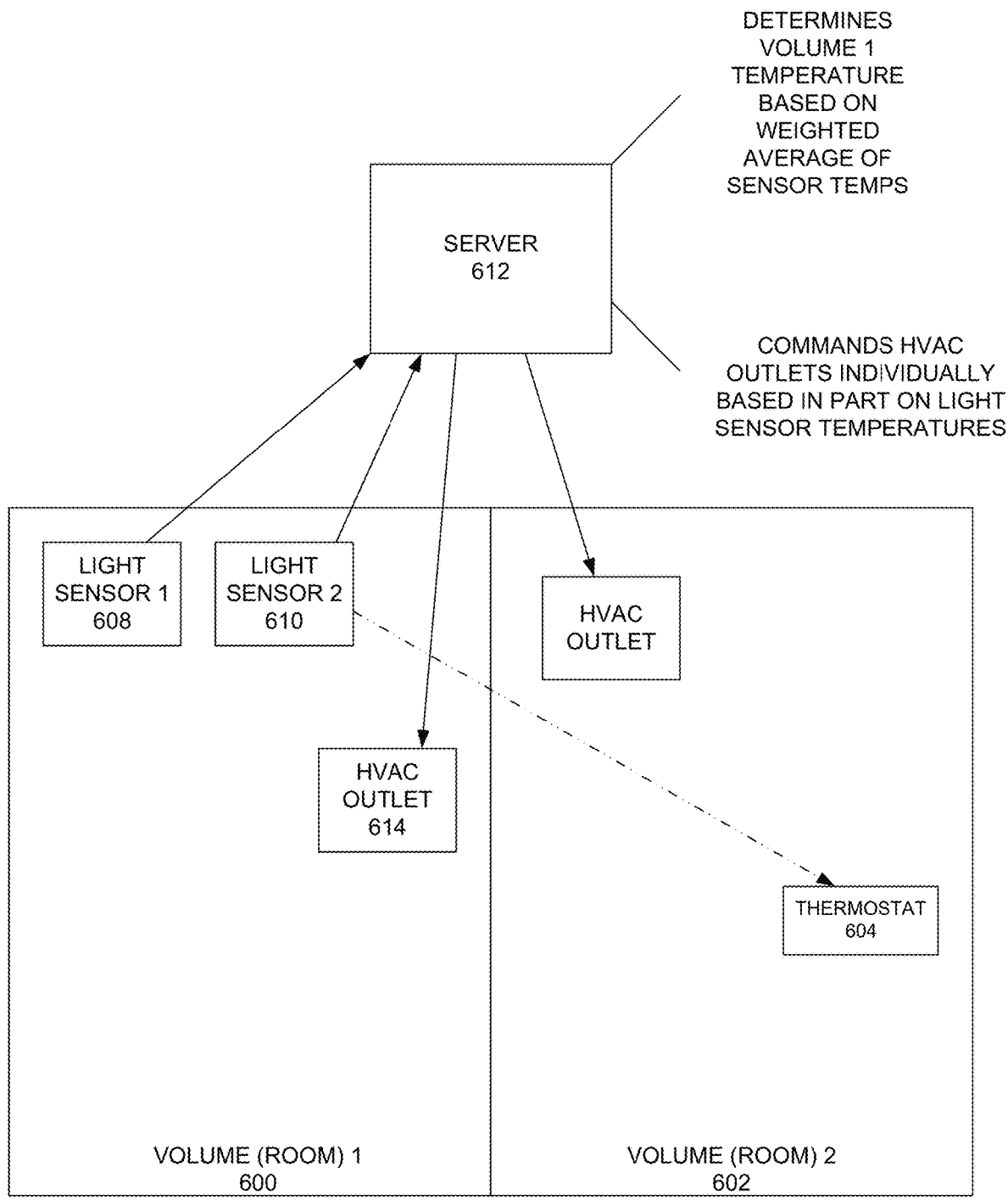
FIG. 6 is a diagram depicting a system for monitoring a temperature in a volume using luminary based sensors.

FIG. 6 is a diagram depicting a system for monitoring a temperature in a volume using luminary based sensors. The system seeks to control the temperature in volume 1 600, despite volume 1 600 not including any thermostats for measuring the local temperature. The only thermostat 604 is in volume 2 602. In some configurations the temperature may vary substantially between volume 1 600 and volume 2 602, where the HVAC settings in volume 1 are controlled based on thermostat-sensed temperatures measured at 604 in volume 2 606. The example of FIG. 6 utilizes additional temperature sensors positioned in, on, or near luminaries positioned near the ceiling of volume 1 600, indicated at 608, 610. Those light based sensors 608, 610 measure ambient temperature that may be influenced by a state of the corresponding or neighboring light sources. Processors at the sensors 608 may adjust the measured temperatures based on correction factors, as described herein, prior to transmitting temperature data to a server 612. In another example, temperature data can be transmitted to the server 612 in raw form with corrections being made at the server. The server 612 determines an estimated temperature of volume 1 600, such as based on a weighted average of the corrected sensor temperatures from 608, 610. In some embodiments, additional factors are considered in determining an estimated temperature of volume 1 601. Based on the determined estimated temperature, the server 612 commands the thermostat 604 to output warmer or colder air to the volume 1 600 specific HVAC outlet 614. It is noted in some examples, that such processing could be performed using a processor of one of the luminaries (i.e., sensor 608 transmits its temperature data to 610; the data processor at 610 combines its temperature data with that from 608 to determine a volume 1 600 temperature, and light based sensor 610 transmits commands directly to the thermostat 604 to adjust the output of HVAC outlet 614.

As noted above, a number of additional factors could be considered by a server or light sensor processors in determining estimated ambient temperatures. In one example, correction factors for each of a plurality of light source status zones are bulb type specific. Temperature estimates could further be adjusted based on factors such as whether the associated light bulb is within a lampshade, an open fixture, an enclosed fixture, or a recessed fixture (e.g., a recessed can fixture will typically measure ambient temperatures higher than an open fixture because more heat from the light source will be retained within the fixture). Corrections to measured temperatures could further be based on ambient light detected in a volume being considered. Sunlight into a room can result in it feeling 3-5 degrees warmer than the actual ambient temperature to occupants. Thus, if ambient light is measured to be high, the estimated temperature or the control to the thermostat can be adjusted accordingly. In another example, an online accessible weather report is accessed to determine a sunlight level in a room. Fans running in a volume can also affect temperature measured by a sensor, with adjustments being made based on detection of such a fan's operation (e.g., via a sensed sound level, sensed air movement, or via an indicated control value for the fan).

Figure 7:
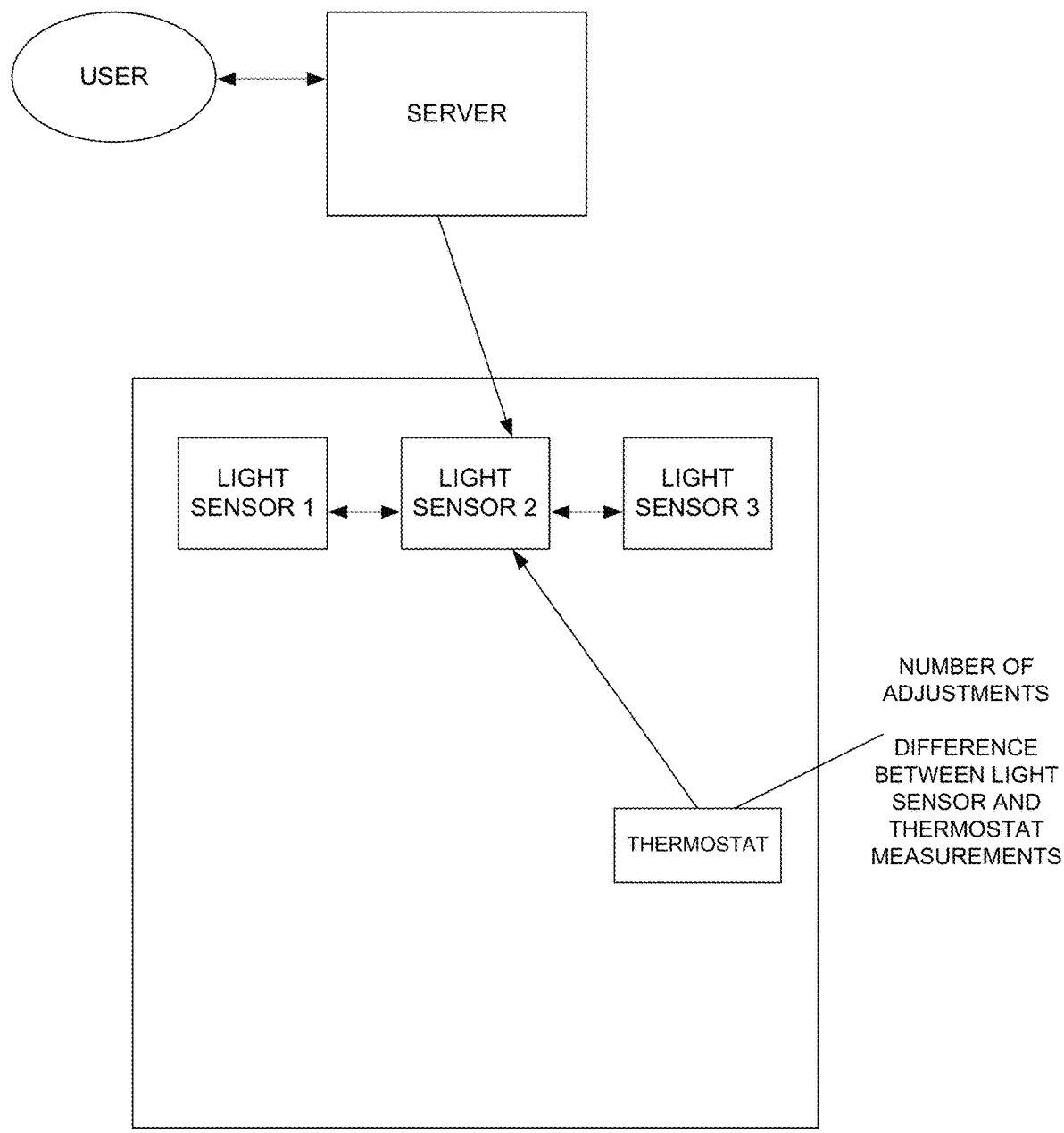
FIG. 7 is a diagram depicting an automated adjustment of correction factors based on user-thermostat adjustment.

FIG. 7 is a diagram depicting an automated adjustment of correction factors based on user-thermostat adjustment. In the example of FIG. 7, a plurality of light-based temperature sensors take temperature sensors of a volume and transmit temperature data to a server. That server adjusts a thermostat for the room, heating or cooling the volume. A server may monitor how often a user adjusts the thermostat manually, overriding the control of the server. If a user consistently turns down the temperature manually, the server can adjust accordingly, realizing that the current server setting for a target estimated temperature to turn on the air conditioning is too high. If the user seldom manually adjusts the thermostat, then the server can continue operating as-is, with the understanding that the current correction factors and algorithms are likely well-calibrated.

Figure 8:
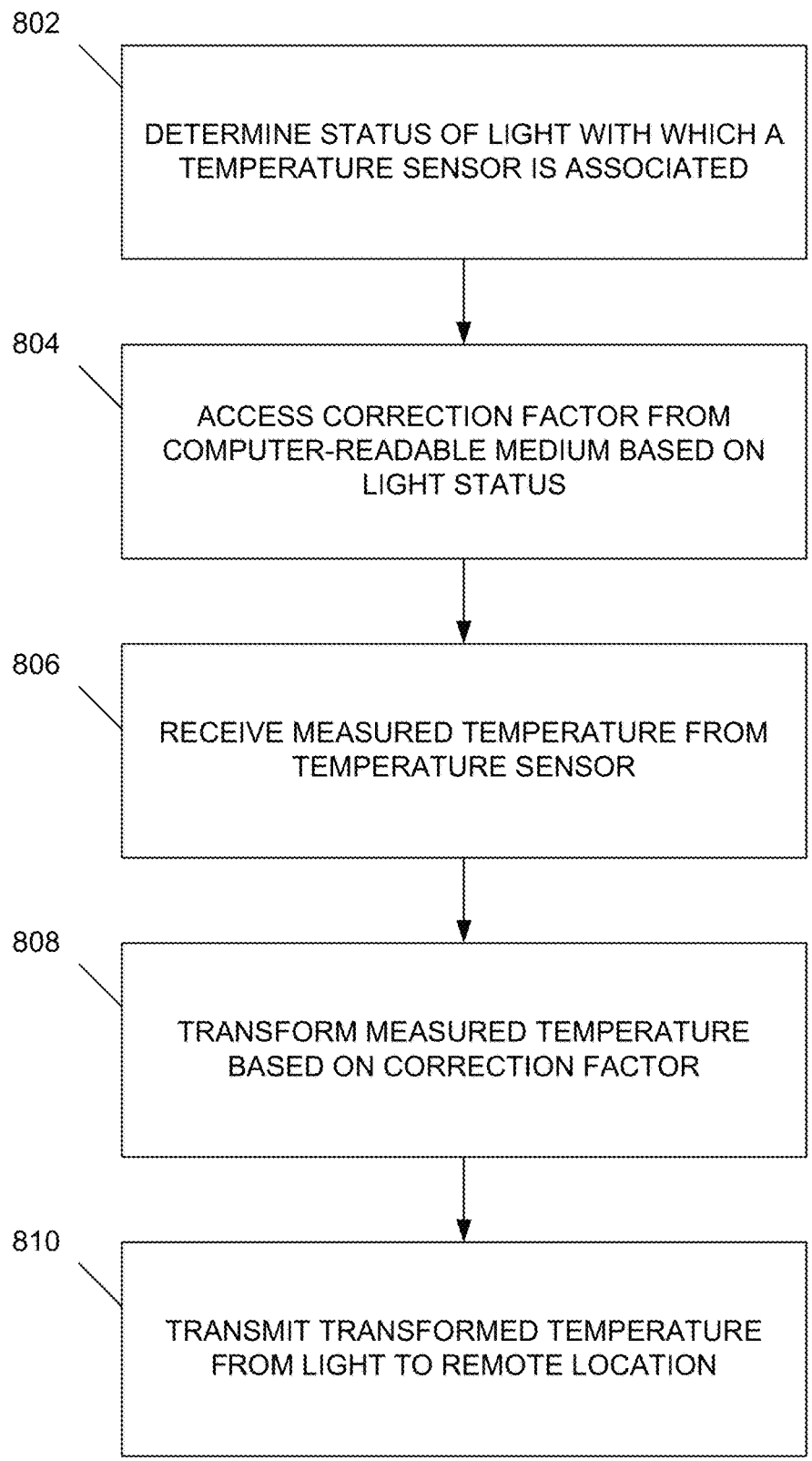
FIG. 8 is a flow diagram depicting a processor-implemented method of determining an ambient temperature in a volume using a lighting based sensor.

FIG. 8 is a flow diagram depicting a processor-implemented method of determining an ambient temperature in a volume using a lighting based sensor. At 802, a status of a light with which a temperature sensor is associated is determined. A correction factor is accessed at 804 from a computer-readable medium based on the status of the light. A measured temperature is received via the temperature sensor at 806. At 808, the measured temperature is transformed based on the correction factor, and the transformed temperature is transmitted at 810 from the light to a remote location.

This application uses examples to illustrate the invention. The patentable scope of the invention includes other examples. For example, to enable continued temperature measurement when a light source is off (i.e., typically a light bulb draws no power when off due to an open circuit), a system can be configured to maintain a closed circuit, even when the light source is off, so that temperature sensor operations can still be maintained, despite the light source being off (e.g., at night).

As another example, in a volume having multiple light based temperature sensors, a server or light-based data processors can compare temperature measurements among the sensors in the volume to determine whether any are outliers. Such sensors giving out of family measurements can be voted out or otherwise ignored when controlling the volume environment.

In another example, a distance sensor can be incorporated into a luminary to determine a distance to the floor and an area (e.g., 4-8 feet off the floor) where temperature control is most desirable). Temperature measurements at the luminary can be adjusted based on a distance from the luminary to the floor or region of desired control.

In one example, a number of correction factor profiles for time period zones (e.g., zones (1)-(4) of FIG. 5) could be included in a luminary based memory, each profile being associated with a calibration operation temperature pattern. A calibration operation is performed as described in FIGS. 3 and 4, with the resulting temperature pattern (e.g., as depicted in FIG. 4) being compared to the baseline patterns stored in the memory. Correction factors associated with a closest matching baseline pattern could then be selected.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A system for monitoring an ambient temperature in a volume using a lighting based sensor, comprising:
    a light;
    a temperature sensor positioned in, on, or attached to the light;
    a computer-readable medium encoded with correction factors associated with a plurality of statuses of the light;
    a data processor configured to:
        determine, via a light status determination module, a status of the light;
        access a correction factor from the computer-readable medium based on the status of the light;
        receive a measured temperature via the temperature sensor located in a first volume;
        transform the measured temperature based on the correction factor; and
    a wireless transmitter configured to transmit the transformed temperature from the light to a thermostat in a second volume, separate from the first volume.

2. The system of claim 1, wherein the temperature sensor is positioned in the light or on the light, wherein the temperature sensor is affected by the ambient temperature in the first volume and heat generated by the light.

3. The system of claim 2, wherein the correction factor is used to transform the measured temperature to represent the ambient temperature in the first volume.

4. The system of claim 3, wherein the correction factor is used to transform the measured temperature to represent the ambient temperature at a particular point in the first volume.

5. The system of claim 4, wherein the particular point is a height associated with humans standing or sitting in the first volume.

6. The system of claim 2, wherein the temperature sensor is further affected by a temperature of a data processor in the light.

7. The system of claim 1, wherein the status of the light is based on one or more of:
    whether the light is on, whether the light is off, an amount of time that the light has been on, an amount of time that the light has been off, and a power level of the light.

8. The system of claim 1, wherein the data processor is further configured to determine a light status category based on the light status, and wherein the computer-readable medium is further encoded to include one correction factor for each of a plurality of light status categories.

9. The system of claim 8, wherein the light status categories include one or more of light warming up, light full power steady state, light cooling down, light recently off, light off, and light less than full power steady state.

10. The system of claim 8, wherein the correction factor changes based on a length of time that the light has been in the light status category and a particular time relationship associated with the light status category.

11. The system of claim 10, wherein the particular time relationship is a linear relationship, an exponential relationship, or a constant relationship.

12. The system of claim 11, wherein the data processor is further configured to calibrate the correction factor using a temperature measured by the temperature sensor, a status of the light, and a temperature measurement external to the light.

13. The system of claim 12, wherein the data processor is further configured to calibrate the correction factor by
    evaluating a difference between the temperature measured by the temperature sensor and the external temperature measurement during the status of the light; and
    determining the correction factor based on the difference.

14. The system of claim 1, wherein the transformed temperature is used to adjust a heating or air conditioning unit for the first volume but not other volumes.

15. The system of claim 1, wherein the data processor is further configured to determine a temperature for the first volume based on the transformed temperature and additional temperature measurements from other lighting based temperature sensors.

16. The system of claim 1, wherein the correction factor is adjusted based on a light color currently associated with the light.

17. The system of claim 1, wherein the data processor is further configured to:
    detect an amount of ambient light in the first volume using an ambient light sensor; and
    adjust the transformed temperature or the correction factor based on an amount of detected ambient light.

18. The system of claim 1, wherein the data processor is further configured to adjust the transformed temperature or the correction factor based on whether a fan, an air conditioner, or a heater is running in the first volume.

19. The system of claim 1, wherein the transformed temperature is transmitted from the light via a wireless transmitter.

20. The system of claim 1, wherein the data processor is further configured to determine a frequency at which a thermostat sensor is manually set for the first volume, and wherein the transformed temperature or the correction factor is adjusted based on the determined frequency.

* * * * *